(12) United States Patent
Brandt-Pearce et al.

(10) Patent No.: US 11,212,008 B2
(45) Date of Patent: Dec. 28, 2021

(54) POWER ALLOCATION FOR VISIBLE LIGHT COMMUNICATION

(71) Applicant: University of Virginia Patent Foundation, Charlottesville, VA (US)

(72) Inventors: Maite Brandt-Pearce, Free Union, VA (US); Jie Lian, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 16/407,769

(22) Filed: May 9, 2019

(65) Prior Publication Data

US 2019/0349089 A1 Nov. 14, 2019

Related U.S. Application Data

(60) Provisional application No. 62/668,957, filed on May 9, 2018.

(51) Int. Cl.
| | | |
|---|---|---|
| *H04B 10/116* | (2013.01) | |
| *H04B 10/564* | (2013.01) | |
| *H04B 10/67* | (2013.01) | |
| *H04B 10/80* | (2013.01) | |

(52) U.S. Cl.
CPC ........ *H04B 10/564* (2013.01); *H04B 10/116* (2013.01); *H04B 10/672* (2013.01); *H04B 10/808* (2013.01)

(58) Field of Classification Search
USPC .................................. 398/103, 118–131, 172
See application file for complete search history.

(56) References Cited

U.S. PATENT DOCUMENTS

| | | | |
|---|---|---|---|
| 8,744,504 B2* | 6/2014 | Faccin ................. | H04B 7/0413 455/507 |
| 9,312,954 B2* | 4/2016 | Chen ..................... | H04B 10/11 |
| 10,003,409 B2* | 6/2018 | Yu ....................... | H04L 27/2601 |
| 2013/0126713 A1* | 5/2013 | Haas .................... | H04B 10/691 250/208.2 |

(Continued)

OTHER PUBLICATIONS

Lian et al: "Multiuser Multidetector Indoor Visible Light Communication System", 2015 Opto-Electronics and Communications Conference (OECC), Jun. 28-Jul. 2, 2015 (Year: 2015).*

(Continued)

*Primary Examiner* — Li Liu (74) *Attorney, Agent, or Firm* — Schwegman Lundberg & Woessner, P.A.

(57) ABSTRACT

A system and method for providing optical multiple input and multiple output data communication using optical signals includes a plurality of light sources, a plurality of photodetectors, and at least one controller. The plurality of light sources are configured to emit optical signals to communicate data. The plurality of photodetectors are configured to sense the optical signals, and are embedded in at least one receiver. At least one of the plurality of photodetectors is configured to receive the optical signals from two or more of the plurality of light sources. The controller is configured to assign a transmit power to at least some of the plurality of light sources based on parameters of the plurality of photodetectors.

24 Claims, 10 Drawing Sheets

(56) References Cited

U.S. PATENT DOCUMENTS

| | | | |
|---|---|---|---|
| 2014/0029952 A1* | 1/2014 | Liu | H04B 10/116 398/115 |
| 2015/0147069 A1* | 5/2015 | Brandt-Pearce | H04L 1/0668 398/186 |
| 2016/0308615 A1* | 10/2016 | Videv | H04B 10/116 |
| 2017/0201321 A1* | 7/2017 | Uysal | H04B 10/516 |
| 2018/0159624 A1* | 6/2018 | Jang | H04N 5/3532 |
| 2018/0254826 A1* | 9/2018 | Jungnickel | H04B 10/1149 |
| 2019/0165859 A1* | 5/2019 | Little | H04B 10/516 |
| 2019/0261239 A1* | 8/2019 | Wang | H04B 10/116 |
| 2020/0177277 A1* | 6/2020 | Seyvet | H04B 10/116 |

OTHER PUBLICATIONS

Lian et al: "Distributed Power Allocation for Multiuser MISO Indoor Visible Light Communications", 2015 IEEE Global Communications Conference (GLOBECOM), Dec. 6-10, 2015 (Year: 2015).*

Wang et al: "Demonstration of High-Speed 2 × 2 Non-Imaging MIMO Nyquist Single Carrier Visible Light Communication With Frequency Domain Equalization", Journal of Lightwave Technology, vol. 32, No. 11, Jun. 1, 2014, pp. 2087-2093 (Year: 2014).*

Hong et al: "Performance of a Precoding MIMO System for Decentralized Multiuser Indoor Visible Light Communications", IEEE Photonics Journal, vol. 5, No. 4, Aug. 2013 (Year: 2013).*

Lian et al.: "Multiuser MISO Indoor Visible Light Communications", 48th Asilomar Conference on Signals, Systems and Computers, Nov. 2-5, 2014 (Year: 2014).*

Lian et al: "Adaptive M-PAM for Multiuser MISO Indoor VLC Systems", 2016 IEEE Global Communications Conference, Dec. 4-8, 2016 (Year: 2016).*

Chen et al: "On the Coverage of Multiple-Input Multiple-Output Visible Light Communications [Invited]", J. Opt. Commun. Netw, vol. 9, No. 9, Sep. 2017 (Year: 2017).*

Liu et al: "Visible-light communication multipleinput multiple-output technology for indoor lighting, communication, and positioning", Optical Engineering, vol. 54(12), Dec. 2015 (Year: 2015).*

Lian, Jie, "Indoor visible light communications, networking, and applications", J. Phys.: Photonics 1 (2019) Jan. 2001, (Jan. 15, 2019), 29 pgs.

* cited by examiner

POWER ALLOCATION FOR VISIBLE LIGHT COMMUNICATION

PRIORITY APPLICATION

This application claims priority to U.S. Provisional Application Ser. No. 62/668,957, filed May 9, 2018, the disclosure of which is incorporated herein in its entirety by reference.

STATEMENT OF GOVERNMENT INTEREST

This invention was made with government support under Grant No. DESC0013195, awarded by the Department of Energy. The government has certain rights in the invention.

TECHNICAL FIELD

This document pertains generally, but not by way of limitation, to visible light communication, and particularly but not by way of limitation to power allocation for light sources in visible light communication systems.

BACKGROUND

Visible light communication (VLC) systems are used to communicate data using optical energy, as compared to much longer wavelength radio-frequency energy, for example. One or more light sources can be controlled to modulate an optical signal to communicate data from one device to another. The receiving device can include one or more sensors configured to sense the optical signal and provide the sensed data to a circuit to recover the communicated data.

SUMMARY

Visible light communication (VLC) is an energy efficient and cost-effective solution for indoor wireless access. The present inventors have recognized, among other things, that it is advantageous to allow multiple lamps to service common receivers simultaneously. To allocate power, a centralized or decentralized approach can be used. For smaller spaces with fewer lamps, a centralized approach can be advantageous, while for larger spaces with several lamps, a decentralized approach can be used to reduce the computational burden on the system.

In an example, a system for providing optical multiple input and multiple output data communication using optical signals includes a plurality of light sources, a plurality of photodetectors, and at least one controller. The plurality of light sources are configured to emit optical signals to communicate data. The plurality of photodetectors are configured to sense the optical signals, and are embedded in at least one receiver. At least one of the plurality of photodetectors is configured to receive the optical signals from two or more of the plurality of light sources. The controller is configured to assign a transmit power to at least some of the plurality of light sources based on parameters of the plurality of photodetectors.

In another example, a method of providing optical multiple input and multiple output data communication using optical signals includes emitting, by a plurality of light sources, optical signals to communicate data; sensing, by a plurality of photodetectors, the optical signals, wherein the plurality of photodetectors are embedded in at least one receiver, and wherein at least one of the plurality of photodetectors is configured to sense the optical signals from two or more of the plurality of light sources; and assigning, by at least one controller, a transmit power to at least some of the plurality of light sources based on parameters of the plurality of photodetectors.

In another example, a visual light communication system for providing optical multiple input and multiple output data communication using optical signals and optical code division multiple-access includes a plurality of light sources, a plurality of photodetectors, and a plurality of controllers. The plurality of light sources are configured to emit optical signals to communicate data. The plurality of photodetectors are configured to sense the optical signals, and are embedded in a plurality of respective receivers. At least one of the plurality of photodetectors is configured to receive the optical signals from two or more of the plurality of light sources. The plurality of controllers are configured to assign a transmit power to at least some of the plurality of light sources based on parameters of the plurality of photodetectors.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A visible light communication (VLC) system is disclosed herein that includes a multiple input multiple output (MIMO) system using centralized or decentralized power allocation algorithms with multiple light-emitting diodes (LEDs) and photodetectors. The system can use optical code division multiple-access (OCDMA) to support multiple users. Time-space minimum mean squared error filters at the receivers can be designed to diminish the effect of multiple-access interference (MAI).

In a centralized power allocation algorithm, all the lamps in the room can be coordinated and controlled by a central controller, for example. Each lamp supports all the receivers within a specified space. The centralized approach can be advantageous in smaller spaces with fewer lamps. In decentralized power allocation algorithms, receivers are supported by a subset of the light sources and multiple controllers may be employed. As compared to the centralized approach, decentralized power allocation algorithms can have similar bit error rate performance with less computational burden, which is advantageous in larger spaces with many lamps.

Figure 1A:
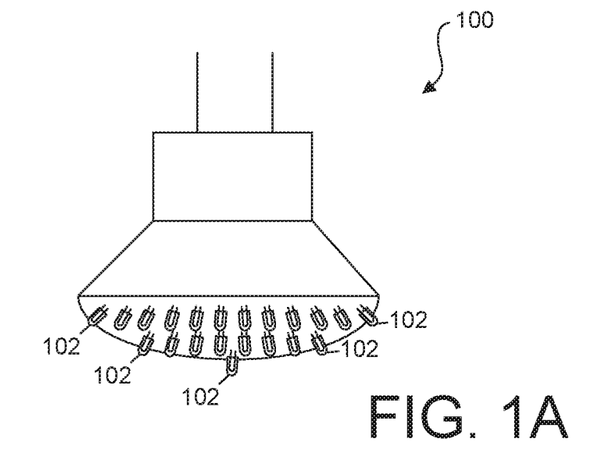
FIGS. 1A and 1B are diagrams illustrating a lamp that includes several light sources for data communication and illumination.
Figure 1B:
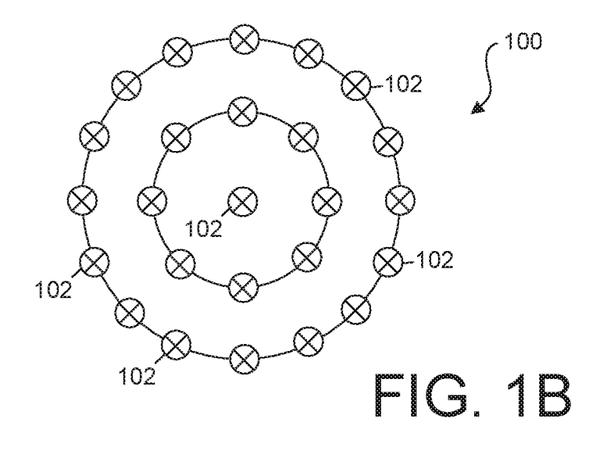

FIGS. 1A and 1B are side-view and bottom-view diagrams, respectively, illustrating a lamp 100 that includes several light sources 102 for data communication and illumination. The light sources 102 can be light-emitting diodes, laser diodes, other solid-state electro-optical devices, or other light sources, for example. The lamp 100 can be any type of luminaire, for example, and can include multiple light sources 102 with different inclination angles. By including several inclination angles, the lamp 100 is able to cover more illumination area within a specified space and provide more power to corner areas of the space, for example. Additionally, each light source 102 can be configured to transmit light that includes information, or is used solely for illumination, providing the system with further control. While illustrated with 25 LEDs, the lamp 100 can include any number of light sources 102 at any number of inclination angles and in any physical layout desirable for a VLC system.

Figure 2A:
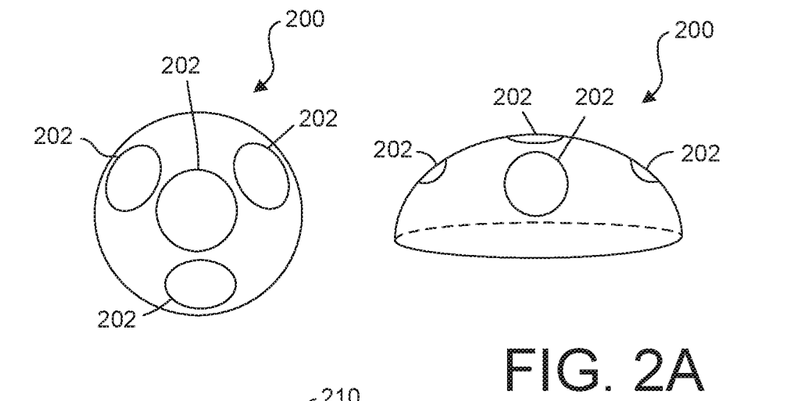
FIGS. 2A and 2B are diagrams illustrating receivers that include several photodetectors for receiving data transmission in a visible light communication (VLC) system.
Figure 2B:
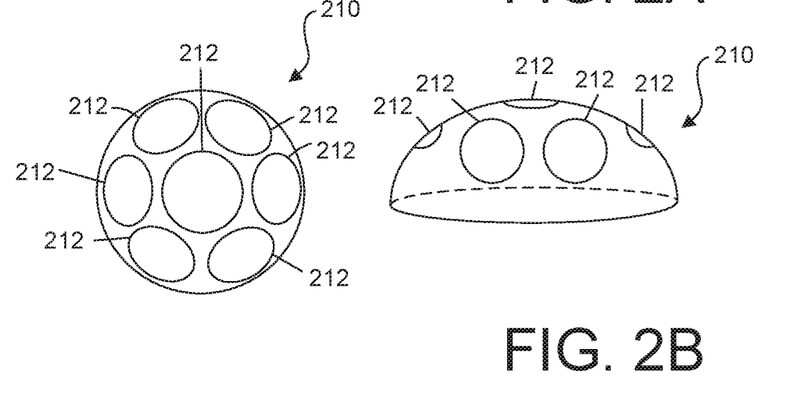

FIGS. 2A and 2B are diagrams illustrating top and side views of example receivers 200 and 210, respectively, that each include several respective photodetectors 202 and 212 for receiving data transmission in a visible light communication (VLC) system. The photodetectors 202 and 212 can be any devices configured to receive an optical signal and convert the optical signal into a respective representative electrical signal. Each photodetector 202 and 212 has a different orientation that depends on its inclination angle. Because of this, the multi-detector receivers 202 and 212 can capture the incident light from different directions. By using the receivers 202 and 212, if the incident light from one direction is blocked, a user that is using a respective receiver 202 or 212 can still receive light with data from other directions. While illustrated as four and seven photodetectors respectively, receivers 202 and 212 can include any number of photodetectors at any number of inclination angles and any physical layout to receive light from lamps or other luminaires in a VLC system.

Figure 3:
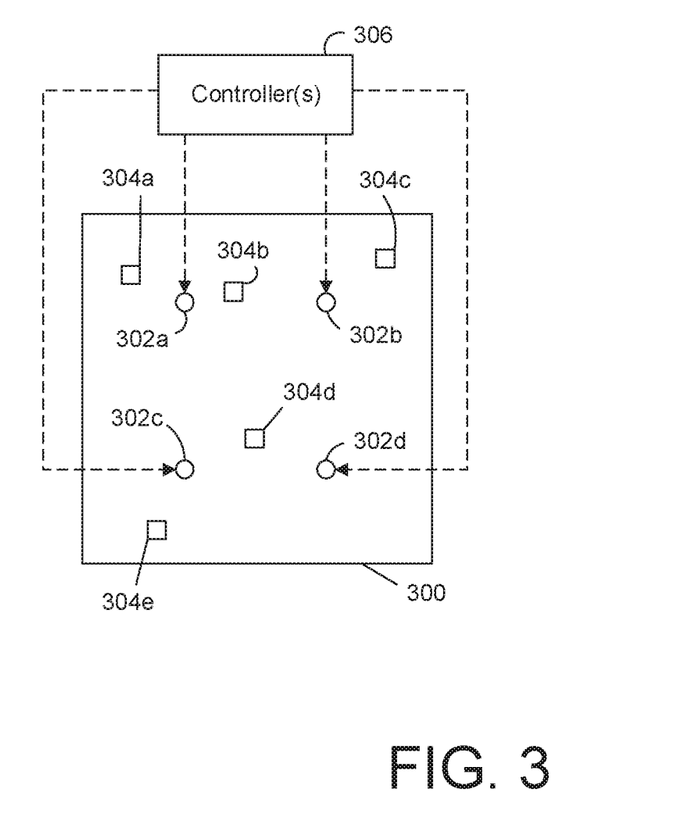
FIG. 3 is a diagram illustrating a space having several lamps and several receivers dispersed throughout the space.

FIG. 3 is a diagram illustrating an example space 300 having several lamps 302a-302d and several receivers 304a-304e dispersed throughout the space 300, which can be one or more rooms within a building, or any other specified space of any size, for example. The lamps 302a-302d are controlled and driven by one or more controllers 306. The lamps 302a-302d can be implemented similar to the lamp 100 illustrated in FIGS. 1A and 1B, or using any other luminaire design, and the receivers 304a-304e can be implemented similar to either of the receivers 202 or 212 illustrated in FIGS. 2A and 2B, or using any other optical receiver design. The lamps 302a-302d can be used for both illumination of the space 300 as well as to transmit data to the receivers 304a-304e. The receivers 304a-304e can be in fixed positions, or can be mobile within the space 300. While illustrated as four lamps and five receivers, any number of lamps and receivers can be present within the space 300.

For the system illustrated in FIG. 3, in an example, the lamps 302a-302d can include white LEDs controlled to send data to the receivers 304a-304e. To send the data, intensity modulation and direct detection (IM/DD) can be employed. In one example, on-off keying can be used to modulate the data. It is desirable to support multiple users with high data rates while limiting the multiple access interference (MAI). To achieve this, multiple input multiple output (MIMO) can be employed. To implement MIMO for the VLC system illustrated in FIG. 3, in an example, direct-sequence optical CDMA (OCDMA) with a time-space minimum mean squared error (MMSE) filter can be used to support multiple users.

In an example, an indoor VLC network can have N lamps, each having Q LEDs with different inclination angles. Therefore, the number of total LEDs in the system is $N_Q = N \times Q$. There can also be K users (receivers) in the indoor environment, and each receiver has V photodetectors (PDs) with different orientations. The signal $i_k(t)$ can be the signal that is intended for a receiver k, which can be represented as $i_k(t) = d_k \cdot c_k(t)$, where $d_k$ is binary data, and $c_k(t)$ is the OCDMA code waveform for the user k. The qth LED can send a linear combination of the users' data, represented as:

$$x_q(t) = \sum_{k=1}^{K} p_{qk} i_k(t) \qquad [1]$$

where $p_{qk} \in [0, p^{max}]$ is the transmitted power of the qth LED allocated to transmitting the data of the receiver k, and $p^{max}$ is the maximum output power of the LED. For example, using intensity modulation, $p^{max}$ can represent the intensity at which current saturation leads to a maximum illumination level. The power levels allocated for each LED can be organized in an $N_Q \times K$ matrix denoted as P.

The signal received by the vth PD of the receiver k can be represented as:

$$r_k^{(v)}(t) = \sum_{q=1}^{N_Q} \hat{h}_{qkv} x_q(t) + n_k^{(v)}(t) \qquad [2]$$

where $k=1, \ldots, K$; $v=1, \ldots, V$; $n_k^{(v)}(t)$ is the noise experienced by the vth detector of the receiver k; and $\hat{h}_{qkv} x_q(t)$ is the channel gain from LED q to the vth detector of the receiver k. Chip matched filtering and sampling can be used, after which, the lth sample of the discrete time signal received by a PD v of a receiver k is:

$$r_k^{(v)}(l) = \sum_{q=1}^{N_Q} h_{qkv} x_q[l] + n_k^{(v)}[l] \qquad [3]$$

where:
$k=1, \ldots, K$; and $v=1, \ldots, V$.

A linear time-space MMSE filter for the receiver k can be defined as $w_k = (w_{k1}, w_{k2}, \ldots, w_{kL})^T$, where $w_{kl} = (w_k[1,1], w_k[2,1], \ldots, w_k[V,1])$, where $l=1, 2, \ldots, L$. Therefore, the length of $w_k$ is VL, where L is the length of the OCDMA code. This time-space MMSE filter can take advantage of the received signal from all the PDs for the receiver k. After the linear MMSE filter, the received decision variable for the receiver k can be represented as:

$$y_k = \sum_{l=1}^{L} \sum_{v=1}^{V} r_k^{(v)}[l] w_k[v,l] + b_k \qquad [4]$$

where $b_k$ is a constant for the linear MMSE estimator. From equations [1]-[4], the decision variable for receiver k after MMSE filtering can be rewritten in a matrix form as:

$$y_k = g(C^T D P^T H_k^T)^T w_k + n_k^T w_k + b_k \qquad [5]$$

where $g(\cdot)$ is a transformation to reshape the matrix into a VL-vector by concatenating the columns. In equation [5], $D = \mathrm{diag}(d_1, d_2, \ldots, d_K)$, and $n_k$ is the noise vector. C, P and $H_k$ are OCDMA, power allocation, and channel gain matrices, respectively.

To derive the time-space MMSE receiver in [5], the mean-squared error $J_k$ for a receiver k is defined as:

$$J_k = E_{d,n}\{(g(C^T D P^T H_k^T)^T w_k + n_k^T w_k + b_k - d_k)^2\} \qquad [6]$$

where $E_{d,n}$ represents expectation with respect to the data vector d and the noise $n_k$. Solving for $$\frac{\partial J_k}{\partial b} = 0, \text{ and } \frac{\partial J_k}{\partial w_k} = 0,$$

the MMSE receiver can be obtained as:

$$w_k = (G + \sigma^2 I)^{-1} g(C^T \Sigma_k P^T H_k^T) \quad [7]$$

$$b_k = \frac{1}{2} - \frac{1}{2} g(C^T P^T H_k^T)^T w_k \quad [8]$$

where $G = E_d\{g(C^T D P^T H_k^T) g(C^T D P^T H_k^T)^T\}$, and I is the identity matrix. $\sigma^2$ represents the noise variance. $\Sigma_k = E_d\{D_{dk}\}$. From equation [5], the signal after the MMSE estimator consists of three parts: the target (intended data) for user k, the MAI, and the noise. For example:

$$y_k = \text{Target} + \text{MAI} + \text{Noise} \quad [9]$$

where Target=$g(C^T D E_k P^T H_k^T)^T w_k + b_k$, MAI=$g(C^T D A_k P^T H_k^T)^T w_k$, and Noise=$n_k^T w_k$, where $E_k$ is defined as a matrix with 1s in each (k, k)th element and 0s in all other positions, and $A_k = I - E_k$.

Figure 4:
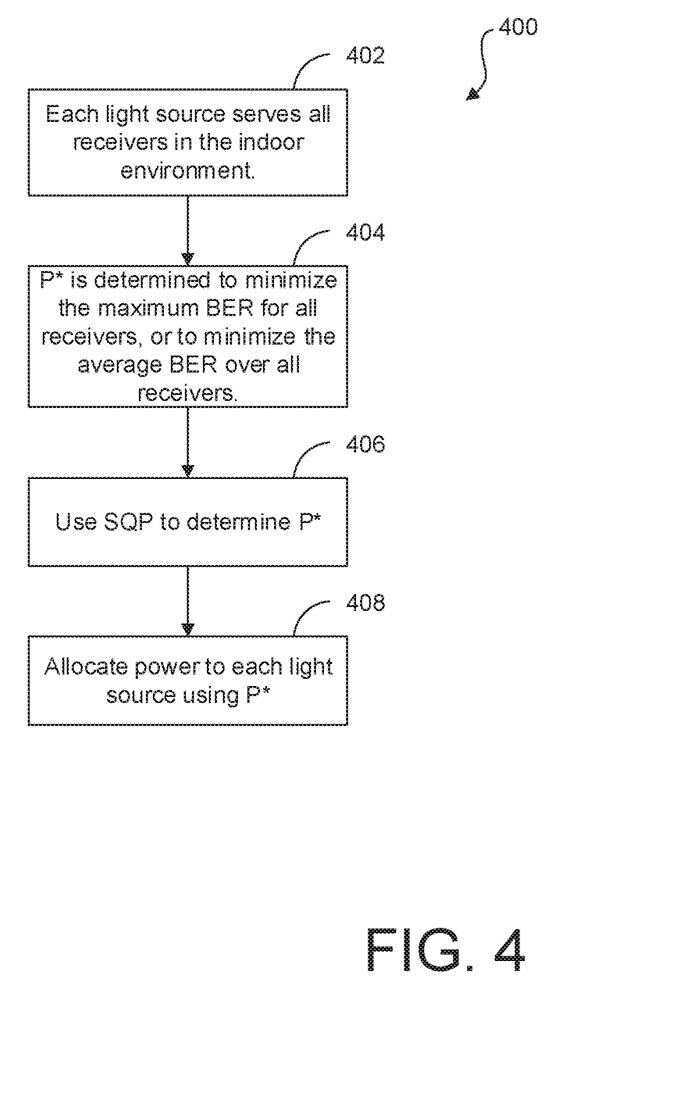
FIG. 4 is a flowchart illustrating a method of providing centralized power allocation for lamps in a VLC system.

FIG. 4 is a flowchart illustrating a method 400 of providing centralized power allocation for lamps in a VLC system. For method 400, which can be referred to as Centralized Multiple Detector Power Allocation Joint Optimization (CM-PAJO), the controller(s) 306 share all channel state information for all lamps 302a-302d. At step 402, for the centralized algorithm, each light source of each lamp 302a-302d serves all the receivers 304a-304e in the space 300. In order to eliminate the MAI, all the lamps 302a-302d allocate power to all of the receivers 304a-304d jointly. The signal-to-interference-plus-noise ratio (SINR) for the receiver k can be calculated as:

$$SINR_k = \frac{\text{Signal}}{MAI + \sigma^2 w_k^T w_k} \quad [10]$$

where:

$$\text{Signal} = w_k^T E_d\{g(C^T D E_k P^T H_k^T) g(C^T D E_k P^T H_k^T)^T\} w_k \quad [11]$$

$$MAI = w_k^T E_d\{g(C^T D A_k P^T H_k^T) g(C^T D A_k P^T H_k^T)^T\} w_k \quad [12]$$

The bit error rate (BER) for the receiver k can be approximated by $BER_k \approx Q(\sqrt{SINR_k})$.

At step 404, to optimize the transmitted power allocation using the centralized approach, two optimization criteria are selected between: to minimize the maximum BER among all the receivers 304a-304e or to minimize the average of BER over all the receivers 304a-304e $$\text{Fairness: } P^* = \arg\min_P \max_k BER_k \quad [13]$$

$$\text{Min-}BER: P^* = \arg\min_P \sum_k BER_k \quad [14]$$

where P* is the optimal power allocation. At step 406, to solve for equations [13] [14], an iterative method, such as the sequential quadratic programming (SQP) algorithm, can be used. For the "Fairness" optimization in equation [13], the objective function can be reformulated into an equivalent nonlinear programming problem by appending additional constraints of the form $BER_k \leq y \forall k$, and then minimizing y over P. The method of Lagrange multipliers can be used to tackle all constraints. Since the two optimizations are non-convex problems, the solution may be a local minimum. Therefore, initial values can be randomly chosen for optimization and the best solution can be selected from all results. At step 408, the transmit power for each light source of each lamp 302a-302d is allocated using the values determined for P*.

Figure 5A:
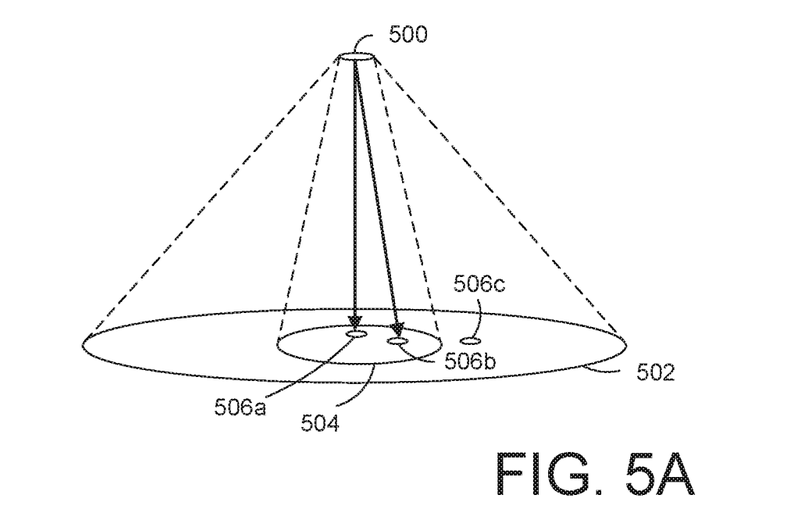
FIGS. 5A and 5B illustrate access areas for individual lamps in a VLC system.
Figure 5B:
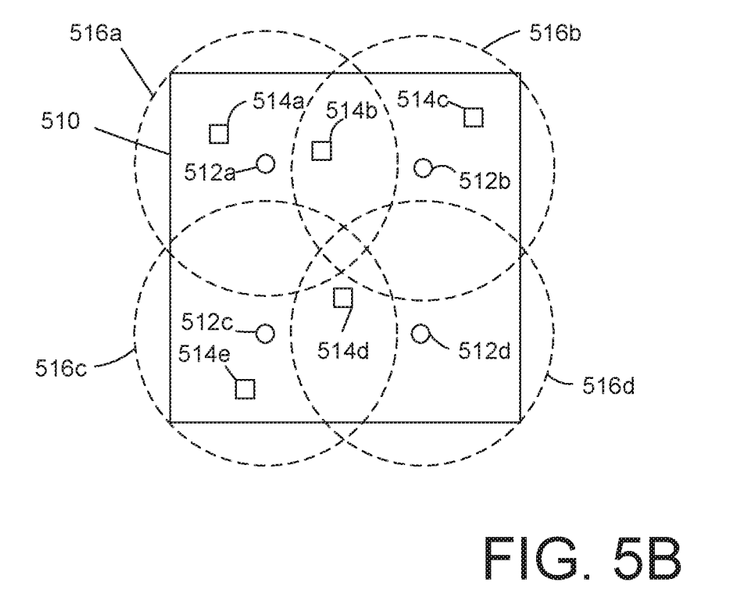

FIGS. 5A and 5B illustrate access areas for individual lamps in a VLC system that can be used in decentralized power allocation algorithms. In a large room with many lamps, the centralized algorithm presented above can become complex. In this case, decentralized power allocation algorithms can be desirable. For the decentralized algorithms, circular access areas 504 can be defined for each lamp 500. The access area 504 can be smaller in diameter than the illumination area 502 of the lamp 500. For example, while all three receivers 506a-506c are within the illumination area 502 of the lamp 500, only receivers 506a and 506b are within the access area 504 of the lamp 500.

FIG. 5B illustrates an example space 510 that includes access areas 516a-516d defined for respective lamps 512a-512d. Receivers 514a-514e receive illumination and data communication from the lamps 512a-512d. To cover the entire indoor area 510, there may be overlap of the access areas 516a-516d as illustrated in FIG. 5B, allowing receivers 514a-514e to be served by multiple lamps 512a-512d simultaneously. Each receiver 514a-514e must be served by at least one lamp 512a-512d, and each lamp 512a-512d can serve more than one receiver 514a-514e. In the example illustrated in FIG. 5B, receivers 514a and 514b are in the access area 516a, receivers 514b and 514c are in the access read 516b, receiver 514d is in the overlap of access areas 516c and 516d, and receiver 514e is in the access area 516c. Controller(s) 306 (illustrated in FIG. 3) can also be used to control the lamps 512a-512d for the VLC system illustrated in FIG. 5. In an example, each lamp 512a-512d can includes a dedicated controller.

As an alternative to the centralized algorithm, the decentralized VLC optimization can be divided into parallel optimization threads. For each optimization thread, the transmit power allocation and filter design work independently from the other threads. Additionally, when the SINR is calculated for each receiver 514a-514e, only messages within the thread are considered (so the MAI is assumed to be caused only by receivers in the same thread). In an example, OCDMA can be utilized as the multiple-access scheme because it can allow each thread to ignore other threads, even if the threads cause some interference. Since each thread works individually, there is no channel information exchanged between the different optimization threads. For all techniques, each lamp 512a-512d knows the data and channel state information for the receivers 514a-514e within its respective access area 516a-516d, and all lamps 512a-512d remain synchronized since a receiver 514a-514e may receive its signal from more than one lamp 512a-512d.

FIGS. 6-9 are flowcharts illustrating methods of providing decentralized power allocation for lamps in a VLC system.

Figure 6:
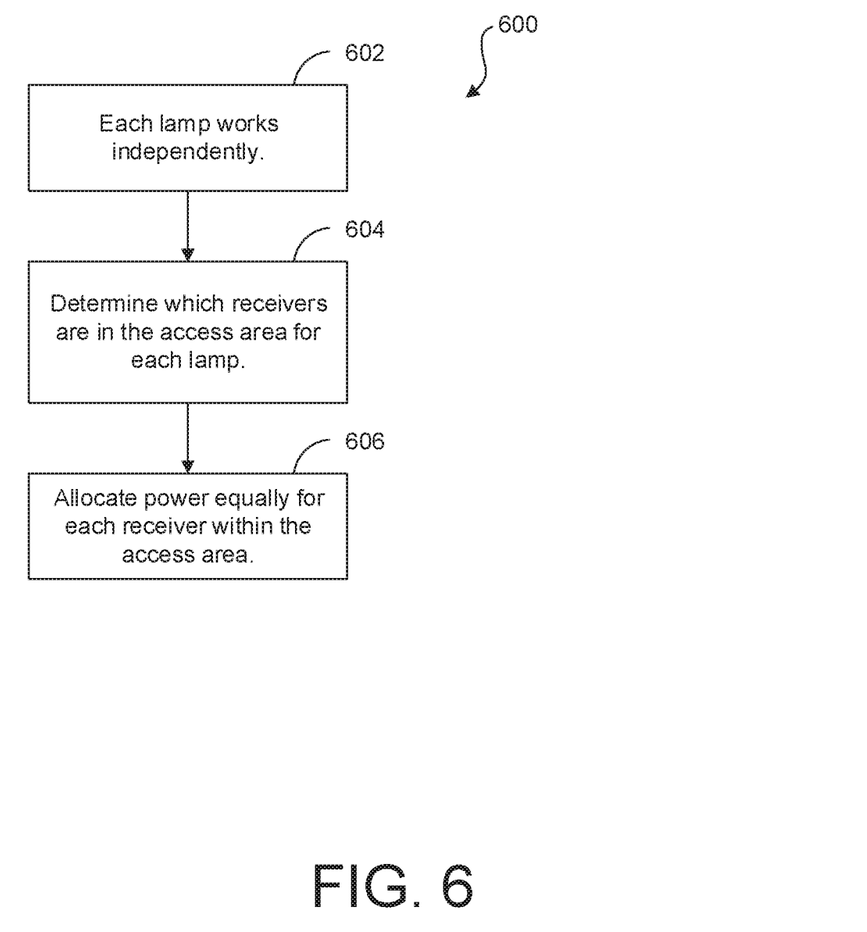
FIGS. 6-9 are flowcharts illustrating methods of providing decentralized power allocation for lamps in a VLC system.

FIG. 6 is a flowchart illustrating a method 600 of allocating power using a decentralized approach. In the first decentralized approach illustrated by method 600, which can be referred to as decentralized Equal Power Allocation (DEPA), at step 602, each lamp 512a-512d works independently and allocates the transmitted power equally to the receivers 514a-514e in its respective access area 516a-516d. If there are no receivers 514a-514e in an access area 516a-516d, the transmitted power from the respective lamp 512a-512d is used for illumination only.

At step 604, the controller(s) determine which receivers 514a-514e are within a respective access area 516a-516d. At step 606, power is allocated based on the receivers 514a-516e that are located within the respective access area 516a-516d. In the example displayed in FIG. 5B, lamp 512a allocates equal transmitted power to receivers 514a and 514b. Similarly, lamps 512b and 512c allocate transmit power for each receiver 514a-514e in their respective access areas 516a-516d equally. Since there is only one receiver 514d in the access area 516d of the lamp 512d, all transmit power is allocated to that receiver 514d.

Figure 7:
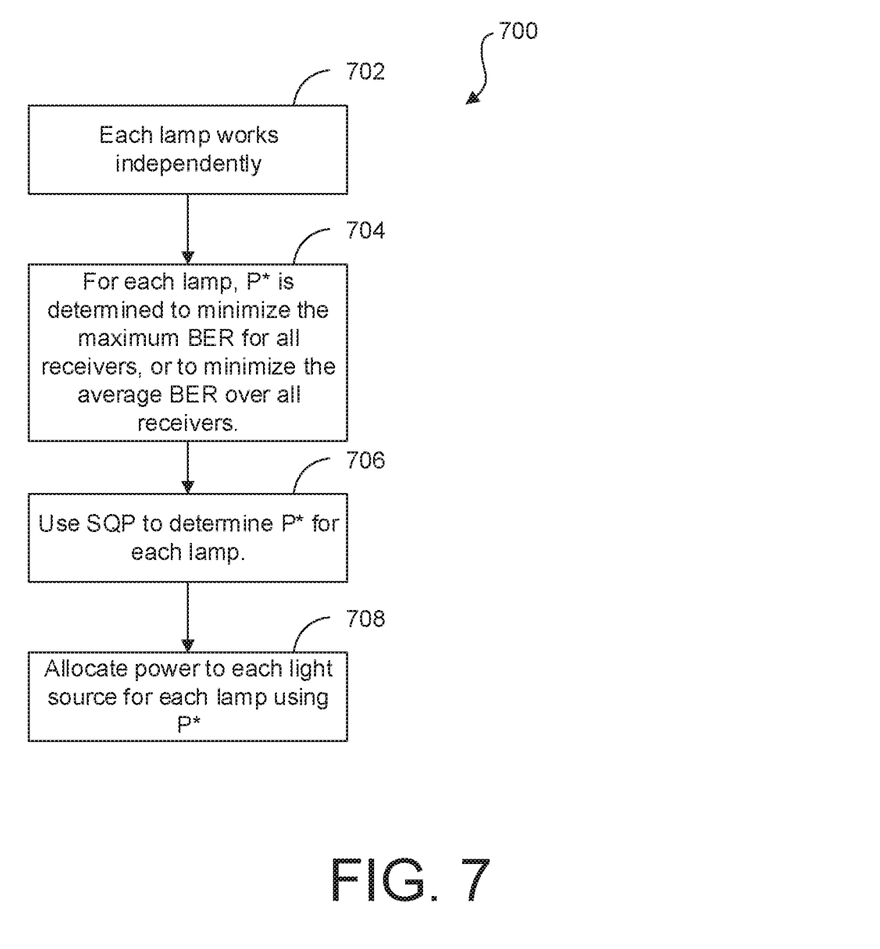

FIG. 7 is a flowchart illustrating a method 700 of allocating power using a decentralized approach. In the method 700, which can be referred to as Power Allocation Disjoint Optimization (PADJO), at step 702, all the lamps 512a-512d work independently. At step 704, similar to method 400, each lamp 512a-512d optimizes the power allocated to the receivers 514a-514e in its respective access area 516a-516d using either of equations [13] or [14]. Assuming there are N lamps in the indoor space, then N optimization threads are used, and all optimization threads can work in parallel. Similar to method 400, at step 706, an iterative method is used to obtain P* for a respective lamp 512a-512d. Similar to the method 600 of FIG. 6, there is no channel information exchanged between lamps 512a-512d. At step 708, power is allocated to each light source of a respective lamp 512a-512d using the determined allocations P*.

For example, using PADJO, all the lamps 512a-512d and receivers 514a-514e in the example shown in FIG. 5B can be divided into four optimization threads. Thread 1 includes lamp 512a and receivers 514a and 514b. Thread 2 includes lamp 512b and receivers 514b and 514c. Thread 3 includes lamp 512c and receivers 514d and 514e. Thread 4 includes lamp 512d and receiver 514d. The four optimization threads work independently. Thus, when the algorithm calculates the SINR for each receiver in a particular thread, only messages within the thread are considered.

Figure 8:
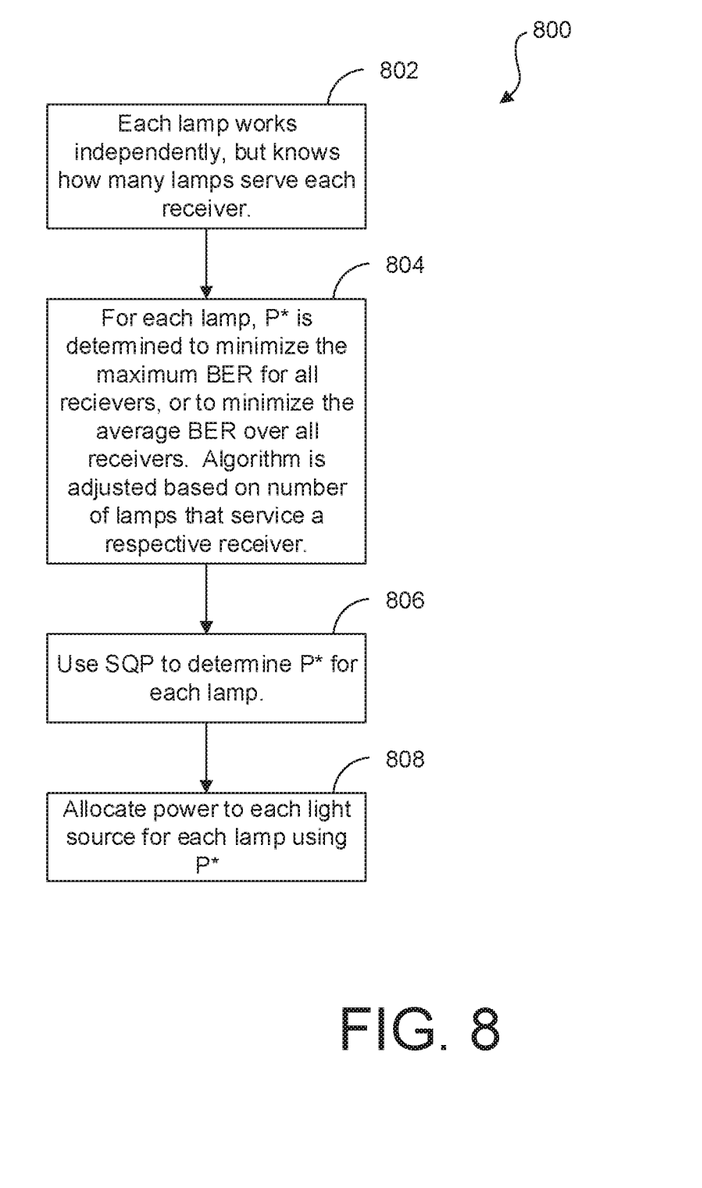

FIG. 8 is a flowchart illustrating a method 800 of allocating power using a decentralized approach. In the method 800, which can be referred to as Weighted Decentralized Multi-Detector Power Allocation Joint Optimization (WDM-PAJO), all the lamps 512a-512d work independently. The lamps 512a-512d need to know how many lamps 512a-512d serve each receiver 514a-514e. However, no channel information is exchanged between lamps 512a-512d. Thus, there are N threads for WDM-PAJO. The SINR for each receiver is weighted by $\tau_k$ to normalize for the extra power received by receivers 514a-514e that are served by multiple lamps 512a-512d. The algorithm calculates:

$$P^*_{\Omega_W^{(i)}} = \arg\min_P \max_{k \in \Omega_W^{(i)}} Q(\sqrt{\tau_k \cdot SINR_k}), \forall i \quad [15]$$

which is similar to PADJO, except it accounts for the number of lamps 512a-512d that serve receiver k, by using $\tau_k$. $\Omega_W^{(i)}$ represents the ith WDM-PAJO optimization thread. $P^*_{\Omega_W^{(i)}}$ is the optimal power allocation matrix for the lamps 512a-512d in the ith thread using WDM-PAJO.

At step 802, similar to PADJO, all the lamps 512a-512d and receivers 514a-514e can be divided into four optimization threads for WDM-PAJO. In this example, at step 804, the transmitted power can be optimized for each thread using equation [15] or a minimum average bit rate across all receivers within a respective thread, with $\tau_{514b}=2$ and $\tau_{514d}=2$, because there are two lamps that serve users 514b and 514d. At step 806, like methods 400 and 700, an iterative algorithm, such as SQP, can be used to determine P* for each thread. In this case, the optimization threads 1-4 can be represented as $\Omega_W^{(1)}=\{\text{lamp } 512a, \text{receiver } 514a, \text{receiver } 514b\}$, $\Omega_W^{(2)}=\{\text{lamp } 512b, \text{receiver } 514b, \text{receiver } 514c\}$, $\Omega_W^{(3)}=\{\text{lamp } 512c, \text{receiver } 514d, \text{receiver } 514e\}$, and $\Omega_W^{(4)}=\{\text{lamp } 512d, \text{receiver } 512d\}$). At step 808, one P* is determined for each thread, power is allocated to each of the respective LEDs of each of the respective lamps 512a-512d.

Figure 9:
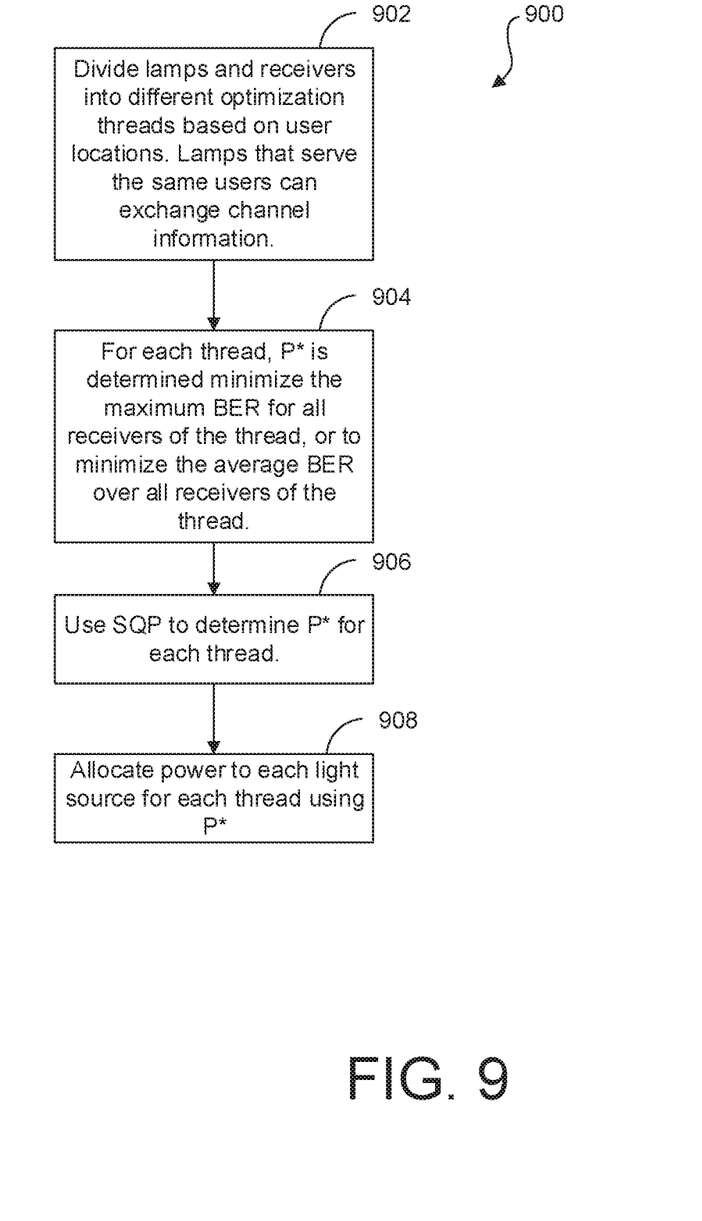

FIG. 9 is a flowchart illustrating a method 900 of allocating power using a decentralized approach. In the method 900, which can be referred to as Partial Decentralized Multi-Detector Power Allocation Joint Optimization (PDM-PAJO), at step 902, the lamps 512a-512d and receivers 514a-514e are divided into different optimization threads depending on the locations of the receivers 514a-514e. As compared to PADJO, the lamps 512a-512d that serve the same receivers 514a-514e can exchange channel information in PDM-PAJO. For example, a controller of one lamp can share channel information with a controller of another lamp. Therefore, the lamps 512a-512d can work together to form an optimization thread.

At step 904, P* is determined for each thread. For PDM-PAJO, the optimization process for a thread is similar to the CM-PAJO case, which, for the minimized maximum BER for all receivers can be described as:

$$P^*_{\Omega_P^{(i)}} = \arg\min_P \max_{k \in \Omega_P^{(i)}} Q(\sqrt{SINR_k}), \forall i \quad [16]$$

where $\Omega_P^{(i)}$ represents the ith PDM-PAJO optimization thread, which contains some lamps 512a-512d and receivers 514a-514e. $P^*_{\Omega_P^{(i)}}$ is the optimal power allocation matrix for the lamps in the ith thread using PDM-PAJO. A similar equation can be used to determine a minimum average BER over all receivers 514a-514e in a thread.

For the example shown in FIG. 5B, all the receivers 514a-514e and lamps 512a-512d can be divided into two optimization threads using PDM-PAJO. Given the locations of the receivers 514a-514e, the two optimization threads can be represented as $\Omega_P^{(1)}=\{\text{lamp } 512a, \text{lamp } 512b, \text{receiver } 514a, \text{receiver } 514b, \text{receiver } 514c\}$, $\Omega_P^{(2)}=\{\text{lamp } 512c, \text{lamp } 512d, \text{receiver } 514d, \text{receiver } 514e\}$. Thus, lamps 512a and 512b can work together to support user 514b by optimizing the transmitted power. At step 906, like methods 400, 700, and 800, an iterative algorithm, such as SQP, can be used to determine P* for each thread using equation [16], for example. When the algorithm calculates the SINR for receiver 514a, the MAI is assumed to be caused by the messages from both lamps 512a and 512b to receiver 514b. Although receivers 514c and 514a are in the same optimization thread, the algorithm can ignore the receiver 514c when calculating the MAI for receiver 514a, since they are not in the same access area. At step 908, one P* is determined for each thread, power is allocated to each of the respective LEDs of each of the respective lamps 512a-512d.

In general, DEPA, PADJO and WDM-PAJO require no coordination between lamps. PDM-PAJO requires some coordination, and CM-PAJO requires the most, depending on the physical location of the users.

Figure 10:
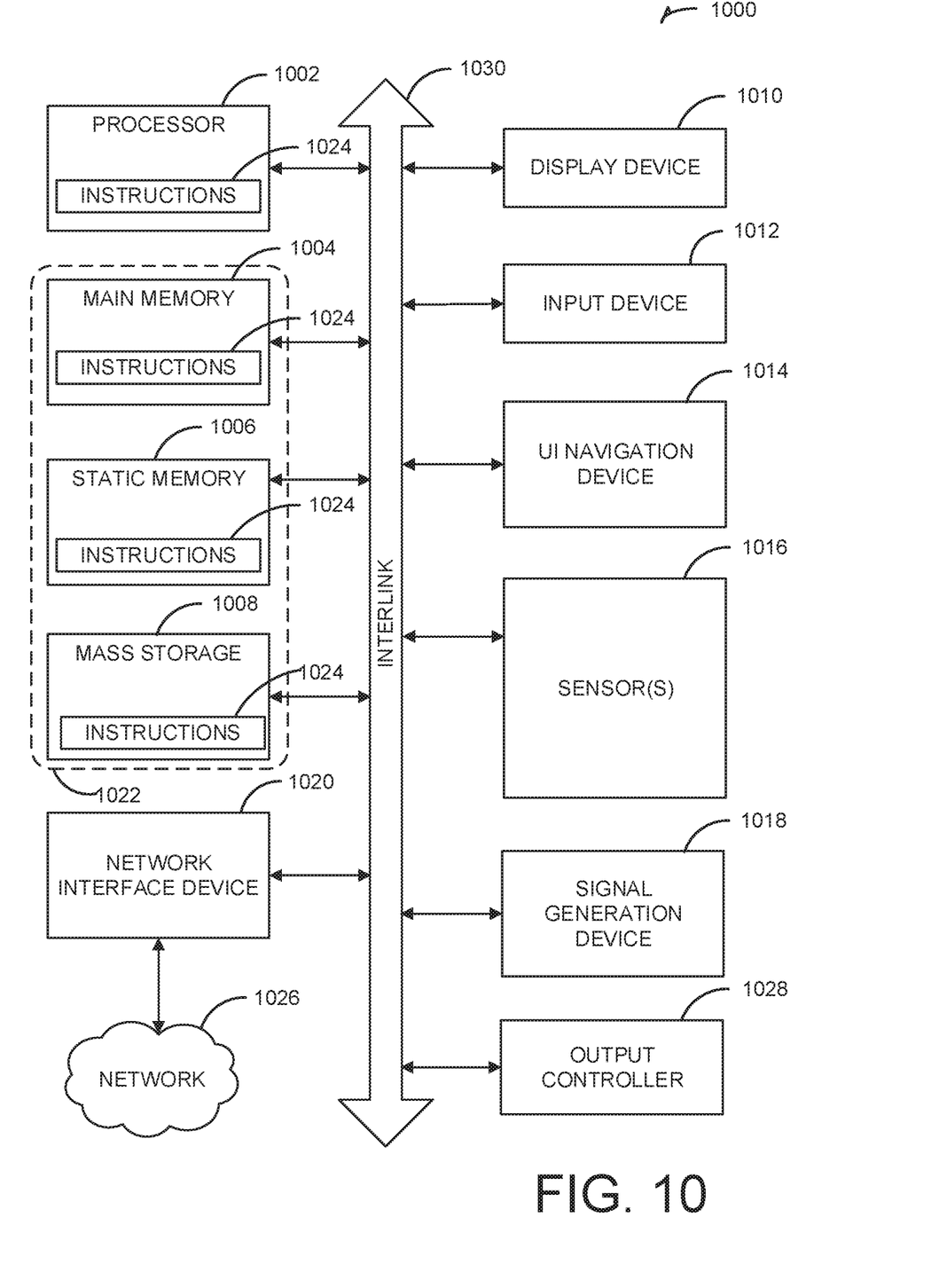
FIG. 10 is a block diagram illustrating an example of a machine upon which one or more embodiments may be implemented.

FIG. 10 illustrates a block diagram of an example machine 1000 upon which any one or more the controllers 306, or any other computing system discussed herein can be implemented. Examples, as described herein, may include, or may operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a user equipment (UE) device such as a tablet PC, a set-top box (STB), a personal digital assistant (PDA), a mobile telephone, or a network side device such as a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 may include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drive, tape drive, flash storage, or other block devices) some or all of which may communicate with each other via an interlink (e.g., bus) 1030. The machine 1000 may further include a display unit 1010, an alphanumeric input device 1012 (e.g., a keyboard), and a user interface (UI) navigation device 1014 (e.g., a mouse). The machine 1000 may additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 may be, or include, a machine readable medium 1022 on which is stored one or more sets of data structures or instructions 1024 (e.g., software) embodying or utilized by any one or more of the techniques or functions described herein. The instructions 1024 may also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 may constitute the machine readable media 1022. While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a visible light communication (VLC)

network, local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as Wi-Fi, IEEE 802.16 family of standards known as WiMax®, IEEE 802.15.4 family of standards, peer-to-peer (P2P) networks, among others). In an example, the network interface device 1020 may include one or more light sources, photodetectors, physical jacks (e.g., Ethernet, coaxial, or phone jacks) or one or more antennas to connect to the communications network 1026. In an example, the network interface device 1020 may include light sources and photodetectors to optically communicate. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system for providing optical multiple input and multiple output data communication using optical signals, the system comprising:
   a plurality of light sources configured to emit optical signals to communicate data;
   a plurality of photodetectors configured to sense the optical signals to receive the data, wherein the plurality of photodetectors are each embedded in at least one receiver at different physical orientations, and wherein at least one of the plurality of photodetectors is configured to receive the optical signals from two or more of the plurality of light sources, and wherein the at least one receiver implements a time-space filter that receives signals from each of the plurality of photodetectors to recover the data; and
   at least one controller configured to assign a transmit power to at least some of the plurality of light sources based on parameters of the plurality of photodetectors.

2. The system of claim 1, wherein the at least one receiver belongs to a plurality of receivers, and wherein the plurality of light sources and the plurality of receivers are grouped into a plurality of optimization threads, and wherein the at least one controller is configured to assign the transmit power based on which of the plurality of optimization threads a respective one of the plurality of receivers belongs.

3. The system of claim 2, wherein the at least one controller is configured to, for each of the plurality of light sources in a respective optimization thread, assign transmit power for the light sources to achieve substantially equal signal-to-interference-plus-noise ratios for each of the plurality of receivers in the respective optimization thread.

4. The system of claim 2, wherein the at least one controller is configured to assign transmit power to respective light sources of a respective optimization thread to at least one of:
   limit a maximum bit error rate across each of the plurality of receivers within a respective optimization thread;
   or limit an average bit error rate across each of the plurality of receivers within the respective optimization thread.

5. The system of claim 4, wherein the assignment of the transmit power to the respective lights sources for a respective optimization thread is weighted based on a number of respective optimization threads that a respective one of the plurality of receivers belongs.

6. The system of claim 2, wherein channel information for respective photodetectors is shared between respective light sources within a common optimization thread.

7. The system of claim 2, wherein the at least one controller is configured to compute a transmit power to assign to each of multiple light sources included in an optimization thread of the plurality of optimization threads using a computed bit error rate (BER).

8. The system of claim 7, wherein the at least one controller is configured to compute the transmit power to assign to each of the multiple light sources using a bit error rate (BER) determined using a number of the multiple light sources included in the optimization thread.

9. The system of claim 1, wherein the at least one receiver belongs to a plurality of receivers, and wherein the at least one controller is configured to execute an iterative method to assign transmit power to the plurality of light sources to at least one of:
- limit a maximum bit error rate across the plurality of receivers;
- or limit an average bit error rate across the plurality of receivers.

10. The system of claim 1, wherein the plurality of light sources are configured at varying inclination angles and wherein the photodetectors are configured at varying inclination angles.

11. A method of providing optical multiple input and multiple output data communication using optical signals, the method comprising:
- emitting, by a plurality of light sources, optical signals to communicate data;
- sensing, by a plurality of photodetectors, the optical signals, wherein the plurality of photodetectors are each embedded in at least one receiver at different physical orientations, and wherein at least one of the plurality of photodetectors is configured to sense the optical signals from two or more of the plurality of light sources, and wherein the at least one receiver implements a time-space filter that receives signals from each of the plurality of photodetectors to recover the data; and
- assigning, by at least one controller, a transmit power to at least some of the plurality of light sources based on parameters of the plurality of photodetectors.

12. The method of claim 11, wherein the at least one receiver belongs to a plurality of receivers, and wherein the method further comprises:
- grouping the plurality of light sources and the plurality of receivers into a plurality of optimization threads,
- wherein assigning, by the at least one controller, the transmit power comprises assigning the transmit power based on which of the plurality of optimization threads a respective one of the plurality of receivers belongs.

13. The method of claim 12, wherein assigning, by the at least one controller, the transmit power comprises assigning, for each of the plurality of light sources in a respective optimization thread, transmit power for the light sources to achieve substantially equal signal-to-interference-plus-noise ratios for each of the plurality of receivers in the respective optimization thread.

14. The method of claim 12, wherein assigning, by the at least one controller, the transmit power comprises assigning transmit power to respective light sources of a respective optimization thread to at least one of:
- limit a maximum bit error rate across each of the plurality of receivers within a respective optimization thread;
- or limit an average bit error rate across each of the plurality of receivers within the respective optimization thread.

15. The method of claim 14, wherein assigning, by the at least one controller, the transmit power further comprises weighting the assignment of the transmit power to the respective lights sources for a respective optimization thread based on a number of respective optimization threads that a respective one of the plurality of receivers belongs.

16. The method of claim 12, wherein assigning, by the at least one controller, the transmit power further comprises sharing channel information for respective photodetectors between respective light sources within a common optimization thread.

17. The method of claim 11, wherein the at least one receiver belongs to a plurality of receivers, and wherein assigning, by the at least one controller, the transmit power comprises executing an iterative method to assign transmit power to the plurality of light sources to at least one of:
- limit a maximum bit error rate across the plurality of receivers;
- or limit an average bit error rate across the plurality of receivers.

18. The method of claim 11, wherein the method further comprises:
- grouping the plurality of light sources into at least one optimization thread that includes multiple light sources of the plurality of light sources; and
- wherein the assigning the transmit power by the at least one controller includes the at least one controller assigning the transit power to each of the multiple light sources included in the at least one optimization thread based on a bit error rate (BER) determined by the at least one controller.

19. The method of claim 18, wherein the method further comprises the at least one controller assigning the transit power to each of the multiple light sources included in the at least one optimization thread based on a bit error rate (BER) determined using a number of the multiple light sources included in the at least one optimization thread.

20. A visual light communication system for providing optical multiple input and multiple output data communication using optical signals and optical code division multiple-access, the visual light communication system comprising:
- a plurality of light sources configured to emit optical signals to communicate data;
- a plurality of photodetectors configured to sense the optical signals, wherein the plurality of photodetectors are each embedded in a plurality of respective receivers at different physical orientations, and wherein at least one of the plurality of photodetectors is configured to receive the optical signals from two or more of the plurality of light sources, and wherein each of the plurality of receivers implement a time-space filter that receives signals from each of the plurality of photodetectors for a respective receiver to recover the data; and
- a plurality of controllers configured to assign a transmit power to at least some of the plurality of light sources based on parameters of the plurality of photodetectors.

21. The visual light communication system of claim 20, wherein the plurality of light sources and the plurality of receivers are grouped into a plurality of optimization threads, and wherein the plurality of controllers are configured to assign the transmit power based on which of the plurality of optimization threads a respective one of the plurality of receivers belongs.

22. The visual light communication system of claim 21, wherein the plurality of controllers are configured to, for each of the plurality of light sources in a respective optimization thread, assign transmit power for the light sources to achieve substantially equal signal-to-interference-plus-noise ratios for each of the plurality of receivers in the respective optimization thread.

23. The visual light communication system of claim 21, wherein the plurality of controllers are configured to assign transmit power to respective light sources of a respective optimization thread to at least one of:
- limit a maximum bit error rate across each of the plurality of receivers within a respective optimization thread;

or limit an average bit error rate across each of the plurality of receivers within the respective optimization thread.

24. The visual light communication system of claim 21, wherein channel information for respective photodetectors is shared between respective light sources within a common optimization thread.

* * * * *